United States Patent [19]

Kogawa

[11] Patent Number: 4,523,135
[45] Date of Patent: Jun. 11, 1985

[54] SAFETY MAINTAINING APPARATUS FOR AUTOMATIC MACHINES

[75] Inventor: Takashi Kogawa, Sakura, Japan
[73] Assignee: Hitachi, Ltd., Tokyo, Japan
[21] Appl. No.: 547,791
[22] Filed: Nov. 2, 1983
[30] Foreign Application Priority Data Nov. 2, 1982 [JP] Japan ............................... 57-191866

[51] Int. Cl.³ .............................................. G05B 9/02
[52] U.S. Cl. .................................... 318/565; 318/590; 318/615
[58] Field of Search ............... 318/563, 565, 566, 590, 318/592, 615

[56] References Cited

U.S. PATENT DOCUMENTS

| 3,721,883 | 3/1973 | Whitmore et al. | 318/615 |
| 4,281,811 | 8/1981 | Nixon | 318/565 X |
| 4,290,000 | 9/1981 | Sun | 318/566 |
| 4,305,028 | 12/1981 | Kostas et al. | 318/566 X |
| 4,375,611 | 3/1983 | Greig | 318/565 X |

Primary Examiner—S. J. Witkowski
Assistant Examiner—W. E. Duncanson, Jr.
Attorney, Agent, or Firm—Beall Law Offices

[57] ABSTRACT

Each of some automatic machines, such as an industrial robot of the type having a servo-amplifier (4) controlled by a central processing unit (1) through a servo-control (3), has a plurality of control modes for moving a movable part (50), for example, teaching and playback modes. In the specified control mode, for example, the teaching mode, the velocity or driving force of the movable part (50) is restrained directly via a man-machine interface (7) by controlling either or both of the servo-amplifier (4) and a power source (5) to regulate driving energy supplied by a servo-motor (8) to the movable part (50) so as to mitigate danger to a person who is near the movable part.

18 Claims, 3 Drawing Figures

SAFETY MAINTAINING APPARATUS FOR AUTOMATIC MACHINES

BACKGROUND OF THE INVENTION

The present invention relates to a safe measure for preventing the occurrence of a disaster which is ascribable to the motion of the movable part of an automatic machine such as an industrial robot.

Regarding an automatic machine, such as industrial robot or NC machine tool, wherein an object or a tool is moved to a target position given by a control signal, a dangerous situation arises when a person or the like is within the moving limits of a movable part during the operation of the automatic machine.

As to the industrial robot etc., there is a considerably high probability of the entry of a person into the moving limits of the movable part during a specified mode such as a teaching mode. Likewise, as to the NC machine tool etc., dangerous situations are liable to occur at the change of the tool or workpiece, etc.

The control system of such automatic machine, e.g., the industrial robot is often contructed as a servo control system empoying a computer. This control system includes therein the central processing unit of the computer, a servo control circuit at a posterior stage, a servo amplifier and a servomotor at posterior stages, etc.

In order to prevent the occurrence of the dangerous situation, there has heretofore been employed a method in which, when the industrial robot is set at the specified mode such as the teaching mode, a signal is supplied from the central processing unit to the servo control circuit, thereby to restrain the manipulated variable of the movable part such as a manipulator which is manipulated by the servomotor.

The prior-art example, however, has had the disadvantage of becoming quite useless as a safe measure when any fault arises in a portion extending from the servo amplifier to the servomotor, resulting in the runaway of the servomotor.

SUMMARY OF THE INVENTION

An object of the present invention is to eliminate the disadvantage of the prior art described above, and to provide a safety maintaining apparatus for automatic machines wherein, even when any fault arises in the system of a servo amplifier, at least either of the driving force and driving velocity of a movable part is reliably lowered in a specified mode such as a teaching mode, whereby safety is satisfactorily kept.

In order to accomplish the object, the present invention directly limits the operation of a portion consisting of a servo amplifier, a power source unit therefor, etc., namely, a portion for feeding a servomotor with driving energy, when an automatic machine is set at a specified mode such as a teaching mode.

In a case where the servomotor is of the electric type, an example of an expedient for the limitation is to make the armature voltage of the servomotor lower than an ordinary value. Another example is to limit the gain of an amplifier for a current command signal, the amplifier being included in the current feedback system of the servomotor. In either case, the torque of the servomotor, i.e., a driving torque is limited. Still another example of the limitation expedient is to limit the gain of an amplifier for a velocity command, the amplifier being included in the velocity feedback system of the servomotor. In this case, the velocity of the servomotor is suppressed.

DESCRIPTION OF THE PREFERRED EMBODIMENTS

Figure 1:
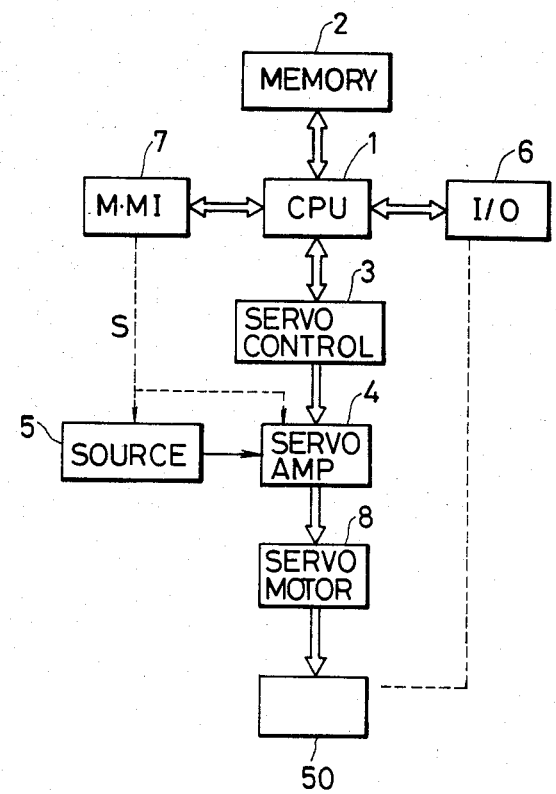
FIG. 1 shows an embodiment of the present invention, and is a block diagram of a safety maintaining apparatus for automatic machines.

There will now be described an embodiment of the present invention shown in FIG. 1. Numeral 1 in this figure designates the central processing unit of a computer. Numeral 2 designates a memory, numeral 3 a servo control circuit, numeral 4 a servo amplifier, and numeral 8 a servomotor. Shown at numeral 50 is that movable part of an industrial robot which is moved by the servomotor 8. An interface 6 receives a predetermined feedback signal from the movable part 50 or another part, and transmits it to the central processing unit 1. Numeral 7 indicates a man-machine interface, and numeral 5 a power source for the servo amplifier 4. A teaching mode or a playback mode can be appointed by operating the man-machine interface 7. A signal S indicated in the figure is provided in the specified mode such as the teaching mode, and is transmitted to both the power source 5 and the servo amplifier 4. With such transmission of the signal S, energy to be supplied from the servo amplifier 4 to the servomotor 8 becomes ready to be limited in any form. Items worthy of note in the apparatus of FIG. 1 are that the signal S indicative of the specified mode is not produced from the central processing unit 1, but from the man-machine interface 7, and that this signal S is not applied to the servo control circuit 3, but to the servo amplifier 4 as well as the power source 5.

Figure 2:
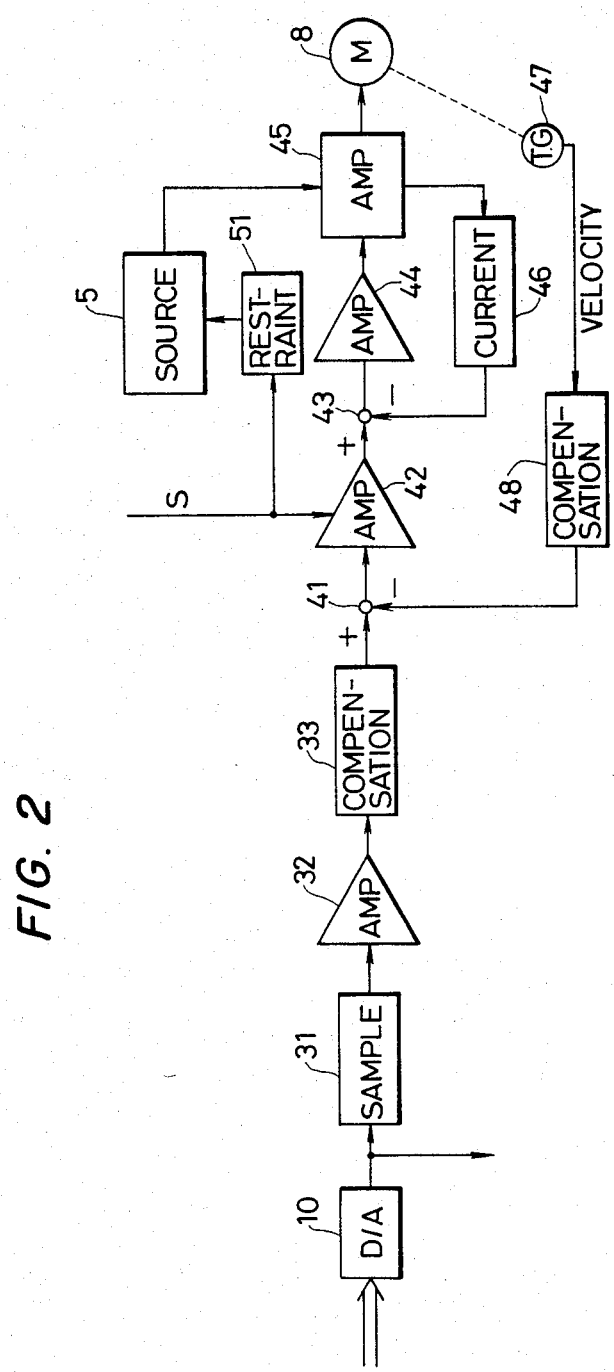
FIG. 2 is a block diagram showing a servo amplifier system in FIG. 1 more particularly.

FIG. 2 shows the essential portions in FIG. 1 more in detail. Referring to FIG. 2, numeral 10 denotes a digital-to-analog converter which functions to convert digital deviation data, applied from the central processing unit 1, into analog data. In the data, commands concerning a position and a velocity are included. Accordingly, a command concerning an acceleration or a force is also included. Shown at numeral 31 is a sample-and-hold circuit, which functions to sample the output of the converter 10 at a predetermined timing and to hold it as a control signal for an illustrated channel, thereby permitting the converter 10 to operate in a time-division multiplexing mode. Regarding the other channels, signals are derived from the stage preceding the depicted sample-and-hold circuit 31 and are applied to sample-and-hold circuits similar to that 31, corresponding to the channels. The number of the channels agrees with the number of the degrees of freedom of the industrial robot, and only one of the channels is illustrated. Numeral 32 denotes an amplifier which amplifies the output of the sample-and-hold circuit 31. A phase compensation circuit 33 is connected at the stage succeeding the amplifier 32, and it plays the role of holding the stability of the servo system. The aforementioned components 31, 32 and 33 correspond to the servo control circuit 3 in FIG. 1.

Numerals 41 and 43 indicate subtractors, which execute comparison operations for forming a velocity feedback system and a current feedback system, respectively. An amplifier 42 is arranged at the stag posterior to the subtractor 41, and it is especially of the type having a variable gain. This amplifier 42 functions to increase the gain of the velocity feedback system. Another amplifier 44 arranged at the stage posterior to the subtractor 43 functions to increase the gain of the current feedback system and also to drive a power amplifier 45. This power amplifier 45 serves to supply driving electric power to the servomotor 8. Shown at numeral 5 is the power source of the power amplifier 45. A current detector circuit 46 serves to detect current outputted from the power amplifier 45 and to feed it back to the subtractor 43. A tacho-generator 47 serves to detect a feedback signal which expresses the rotational velocity of the servomotor 8. An advance compensation circuit 48 is for compensating the operation of the velocity feedback system. The aforementioned components from the subtractor 41 to the advance compensation circuit 48 correspond to the servo amplifier 4.

Numeral 51 designates a voltage restraint circuit which is connected to the power source 5. The signal S stated before is fed to the variable-gain amplifier 42 and the supply voltage restraint circuit 51. When the industrial robot is set at the specified mode and the apparatus is fed with the signal S, the gain of the variable-gain amplifier 42 is lowered from an ordinary gain value, thereby to lower the gain of the velocity feedback loop, and simultaneously, the supply voltage restraint circuit 51 operates to lower the output voltage of the power source 5 from an ordinary magnitude, e.g., 200 V to 120 V.

Figure 3:
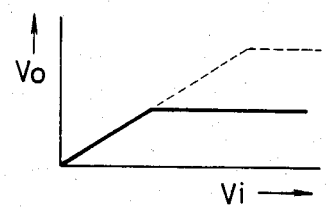
FIG. 3 is a graph showing the amplifying chracteristics of one amplifier in FIG. 2.

The variable-gain amplifier 42 is such that the input resistances of a feedback amplifier circuit constructed of an operational amplifier are changed-over by an analog switch which, in turn, is controlled by the signal S. FIG. 3 exemplifies the amplification characteristics of the amplifier 42. When the signal S has been transmitted, the characteristic indicated by a broken line in the figure is changed-over to that indicated by a solid line. In the situation of the solid line, therefore, even when an input signal $V_i$ concerning the velocity has a high level, an output signal $V_o$ corresponding thereto is corrected into a fixed value of low level.

In a case where the servomotor 8 is a D.C. servomotor, the power source 5 is often constructed of a circuit which produces direct current by rectifying three-phase alternating current. The supply voltage restraint circuit 51 may therefore be so constructed that the taps of a transformer on the three-phase A.C. side are switched by the signal S, or that a thyristor half bridge circuit is used as a rectifier, to switch D.C. side voltages with the signal S or to switch output voltages under chopper control on the D.C. side.

In this embodiment, when the man-machine interface 7 has been operated to set the industrial robot at the specified mode such as the teaching mode, the signal S is fed directly from this man-machine interface 7 to the variable-gain amplifier 42 and the supply voltage restraint circuit 51. Thus, the gain of the velocity feedback loop of the servomotor 8 is lowered, so that the moving velocity of the movable part 50 is lowered from an ordinary velocity down to a predetermined velocity. In addition, a voltage to be applied to the armature of the servomotor 8 through the power amplifier 45 is lowered from the ordinary magnitude of 200 V down to 120 V, so that the driving force of the movable part 50 is lowered by a predetermined value from an ordinary driving force. Accordingly, the fear of an injury to a person or the like lessens owing to decrease in kinetic energy retained in the movable part 50 and lowering in a thrust force to be afforded by the movable part 50.

In this embodiment, the signal S is supplied to the servo amplifier 4 which is nearest the servomotor 8 in the servo system, and to the power source 5 therefor. Thus, even when any abnormality due to a fault or the like has arisen in these portions, it hardly effects the lowering of the driving velocity and driving force of the servomotor 8 as based on the signal S. Accordingly, even when the servo system has become abnormal, the safety is reliably maintained.

Besides, in this embodiment, the signal S required when the industrial robot is set at the specified mode such as the teaching mode is derived directly from the man-machine interface 7. Accordingly, when any abnormality has arisen in the CPU 1, the signal S is reliably produced. Therefore, it becomes possible to keep the safety with sufficiently high reliability, and a satisfactory protective function is assured even against computer runaway etc.

In the foregoing embodiment, both the driving velocity and driving force of the movable part such as the manipulator are lowered in the specified mode such as the teaching mode. In order to achieve the effect of the present invention, however, only one of them may well be lowered.

It is also advantageous that the amplifier 44 in FIG. 2 is formed as one of the variable gain type, to which the signal S is led to thereby lower the gain of this amplifier or impart a limitation, similar to that in FIG. 3, in the specified mode. In this case, the current of the servomotor 8 is limited, with the result that the torque thereof is limited.

In the situation in which the torque of the servomotor 8 is limited, such a command as increasing the velocity of the movable part 50 rapidly becomes invalid, but this forms no obstacle in practical use. The reason is that most operations in, e.g., the teaching mode are to move the movable part 50 in a desired direction and to stop it upon arrival thereof at a desired position, no importance being attached to the velocities in the operations.

Needless to say, the present invention is not restricted to the case of employing the electrical servomotor as in the foregoing embodiment, but it is also applicable to an industrial robot or the like automatic machine which employs a fluid pressure servomotor such as hydraulic motor. At this time, the discharge pressure and discharge rate or the like of a source of fluid pressure to be supplied to the servomotor may be lowered by the signal S.

What is claimed is:

1. In an automatic machine having a movable part driven by a servo-control system and which operates in a plurality of different modes, a safety maintaining apparatus for an automatic machine, characterized by:
   means for generating a mode signal indicative of a specified one of a plurality of control modes; and
   means for limiting a velocity of a servomotor in response to reception of the mode signal, the limiting means being arranged in a loop of a servo-amplifier which feeds driving energy to said servomotor for driving said movable part.

2. A safety maintaining apparatus for an automatic machine as defined in claim 1, wherein the mode signal for operating said limiting means when said automatic machine is set at the specified mode is supplied directly from mode setting input means independently of any servo-control system driving said movable part.

3. In an automatic machine having a movable part driven by a servo-control system and which operates in a plurality of different modes, a safety maintaining apparatus for an automatic machine characterized by:

means for generating a mode signal indicative of a specified one of a plurality of control modes; and means for limiting a driving force of a servomotor in response to generation of the mode signal, the limiting means being arranged in a loop of a servo-amplifier which feeds driving energy to said servo-motor for driving said movable part.

4. A safety maintaining apparatus for an automatic machine as defined in claim 3, wherein the mode signal for operating said limiting means when said automatic machine is set at the specified one of said modes is supplied directly from mode setting input means independently of any servo-control system driving said moving part.

5. The apparatus of claim 1, wherein said limiting means includes amplification means coupled to receive said mode signal, which exhibits an amplification characteristic controllable by said mode signal, for regulating the gain of said loop.

6. The apparatus of claim 5, wherein said loop of said servo-amplifier includes first feedback means for providing to said amplification means a first feedback signal indicative of the velocity of said servo-motor.

7. The apparatus of claim 6, wherein said amplification characteristic is reduced upon reception of said mode signal.

8. The apparatus of claim 7, wherein said mode signal is supplied directly from mode setting input means independently of any servo-control system driving said movable part.

9. The appartus of claim 8, wherein said limiting means includes means coupled to receive said mode signal for restraining the magnitude of said driving energy fed by said servo-amplifier to said servo-motor in response to reception of said mode signal.

10. The apparatus of claim 9, wherein said loop of said limiting means includes second feedback means for providing a second feedback signal indicative of the magnitude of said driving energy fed by said servo-amplifier to said servo-motor.

11. The apparatus of claim 10, wherein said restraining means operates to lower the output amplitude of the power source supplying said driving energy to said servo-amplifier.

12. The apparatus of claim 3, wherein said limiting means includes means coupled to receive said mode signal for restraining the magnitude of said driving energy fed by said servo-amplifier to said servo-motor in response to reception of said mode signal.

13. The apparatus of claim 12, wherein said loop of said limiting means includes first feedback means for providing a first feedback signal indicative of the magnitude of said driving energy fed by said servo-amplifier to said servo-motor.

14. The apparatus of claim 13, wherein said restraining means operates to lower the output amplitude of a power source supplying said driving energy to said servo-amplifier.

15. The apparatus of claim 14, wherein the mode signal is supplied directly from mode setting input means independently of any servo-control system driving said movable part.

16. The apparatus of claim 15, wherein said limiting means includes amplification means coupled to receive said mode signal, which exhibits an amplification characteristic controllable by said mode signal, for regulating the gain of said loop.

17. The apparatus of claim 16, wherein said loop of said servo-amplifier includes second feedback means for providing to said amplifier means a second feedback signal indicative of said velocity of said servo-motor.

18. The apparatus of claim 17, wherein said amplification characteristic of said amplifier means is reduced upon reception of said mode signal.

* * * * *